United States Patent
Rai et al.

(10) Patent No.: US 7,292,233 B2
(45) Date of Patent: Nov. 6, 2007

(54) APPARATUS AND METHOD TO CONNECT AN EXTERNAL CAMERA TO AN LCD WITHOUT REQUIRING A DISPLAY BUFFER

(75) Inventors: Barinder Singh Rai, Surrey (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 702 days.

(21) Appl. No.: 10/776,357

(22) Filed: Feb. 11, 2004

(65) Prior Publication Data

US 2005/0174456 A1 Aug. 11, 2005

(51) Int. Cl.
*G09G 5/00* (2006.01)
(52) U.S. Cl. .................. 345/204; 345/670; 345/604
(58) Field of Classification Search ................ 345/690, 345/692, 204, 604, 660, 670
See application file for complete search history.

(56) References Cited

U.S. PATENT DOCUMENTS

| | | | |
|---|---|---|---|
| 5,673,204 A * | 9/1997 | Klingelhofer | 348/578 |
| 5,745,164 A * | 4/1998 | Faris | 348/60 |
| 5,822,542 A * | 10/1998 | Smith et al. | 709/247 |
| 5,828,848 A * | 10/1998 | MacCormack et al. | 709/247 |
| 5,912,710 A * | 6/1999 | Fujimoto | 348/445 |
| 5,936,616 A * | 8/1999 | Torborg et al. | 345/555 |
| 6,023,252 A * | 2/2000 | Yano et al. | 345/1.1 |
| 6,144,797 A * | 11/2000 | MacCormack et al. | 386/46 |
| 6,275,263 B1 | 8/2001 | Hu | |
| 6,344,875 B1 | 2/2002 | Hashimoto et al. | |
| 6,348,925 B1 | 2/2002 | Potu | |
| 6,563,535 B1 | 5/2003 | Anderson | |
| 6,774,912 B1 * | 8/2004 | Ahmed et al. | 345/629 |
| 6,801,219 B2 * | 10/2004 | Colavin | 345/684 |
| 2003/0058343 A1 | 3/2003 | Katayama | |

* cited by examiner

*Primary Examiner*—Ricardo Osorio
(74) *Attorney, Agent, or Firm*—Mark P. Watson

(57) ABSTRACT

A data pipeline and clock control (relationship) that allows image data from a camera to pass directly through a display controller to an LCD without being written into, temporarily stored, and read out of a display buffer, e.g. a VRAM, is provided. Elimination of the video memory (VRAM) lowers the chip cost, reduces the power requirements, reduces delay due to writing and reading from the video memory, and reduces the pin count since fewer power pins are required.

14 Claims, 5 Drawing Sheets

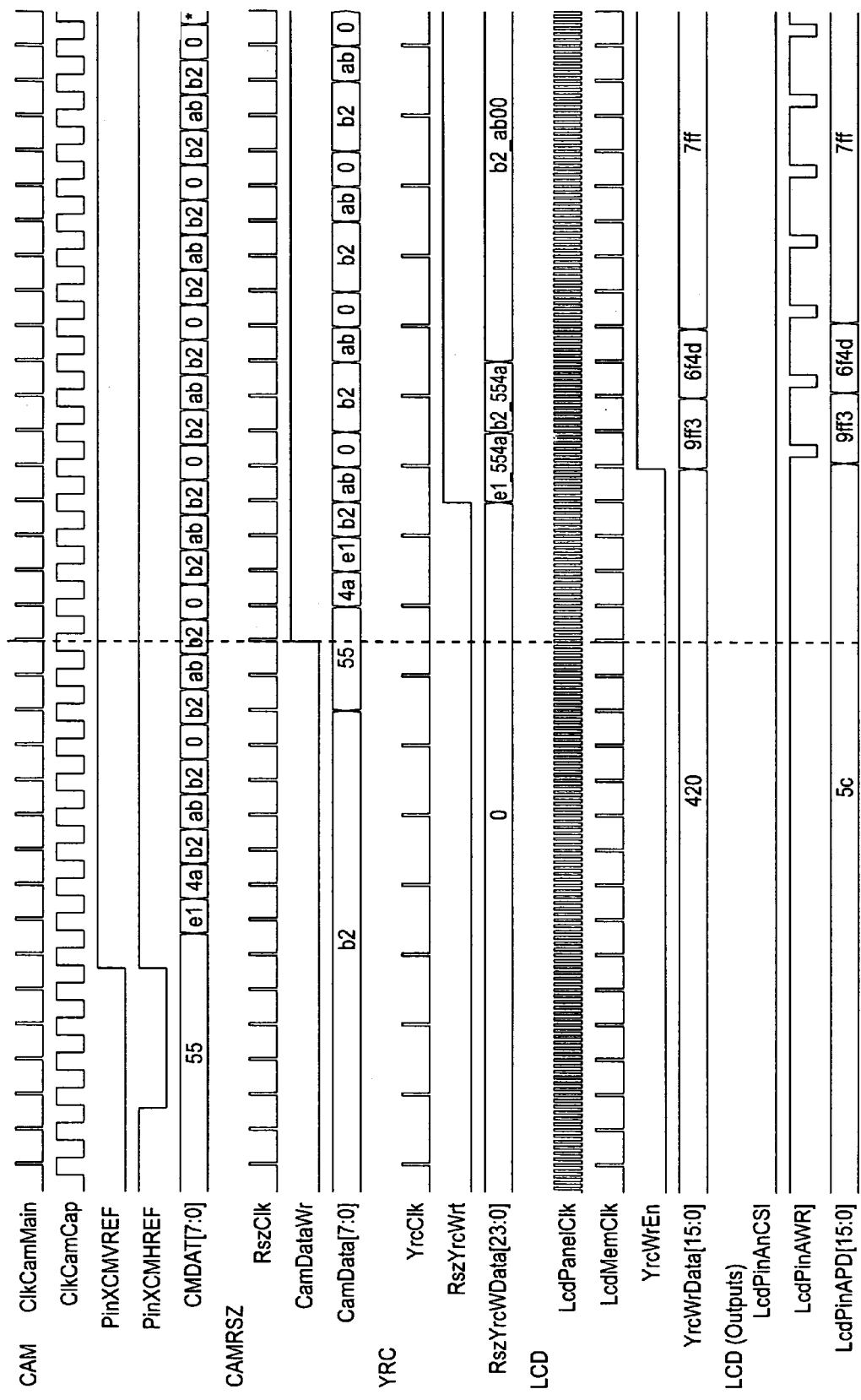
FIG._4

$$\begin{bmatrix} R \\ G \\ B \end{bmatrix} = \begin{bmatrix} E_R E_y & E_R E_{pb} & E_R E_{pr} \\ E_G E_y & E_G E_{pb} & E_G E_{pr} \\ E_B E_y & E_B E_{pb} & E_B E_{pr} \end{bmatrix} \begin{bmatrix} Y \\ U \\ V \end{bmatrix}$$

FIG. 6

APPARATUS AND METHOD TO CONNECT AN EXTERNAL CAMERA TO AN LCD WITHOUT REQUIRING A DISPLAY BUFFER

RELATED APPLICATIONS

The present application is related to the commonly assigned application entitled "Method and apparatus for storing image data using an MCU buffer" filed Jun. 25, 2004, and assigned Ser. No. 10/876,966, which is incorporated herein by reference in its entirety.

BACKGROUND OF THE INVENTION

1. Field of the Invention

The present invention relates to image display systems and more particularly to display controllers that interface between a source of the image data and the display device.

2. Description of the Related Art

Display controllers provide an interface between a data source and a display unit. The data source can, for example, include a central processing unit (CPU) that provides overall control of a pocket PC, hand-held PC, mobile phone, etc. The data source can also be a CMOS camera that is included in a camera-enabled cellular phone with image capture capability, for example. The display unit can be, for example, a liquid crystal display (LCD).

Normally, a display buffer, i.e. video RAM (VRAM), is included in the display controller and is used to transfer image data to the display device. The process involved requires writing to the VRAM, storing the data, and reading from the VRAM. In an office PC environment, this process does not have any major drawbacks. However, in mobile devices, power saving is critical and the power consumption associated with the VRAM can be a disadvantage.

OBJECTS OF THE INVENTION

Recently, RAM embedded LCDs have become available. These LCDs can store one frame of data, for example. The present invention takes advantage of this fact to eliminate the VRAM by providing a data pipeline and clock control (relationship) that allows the data to pass directly through the display controller without being written into, temporarily stored, and read out of the VRAM. Elimination of the video memory lowers the chip cost, reduces the power requirements, reduces delay due to writing and reading from the video memory, and reduces the pin count since fewer power pins are required.

SUMMARY OF THE INVENTION

The present invention provides a method and apparatus for operating a display controller that controls display of color data from a display data source on a display unit. The invention comprises receiving color source data described in a first color space from the display data source and outputting the received color data using a clock frequency of f. In an embodiment, the display data source is a digital camera and the display unit is a liquid crystal display (LCD). Also, the color source data described in a first color space is 8-bit camera data in YUV 4:2:2 format, and the output received color data is in YUV format. Further, in an embodiment, the clock frequency f is 6.5 Mhz.

The invention also comprises trimming and compressing the received color data and outputting resized color data using a clock frequency of f. In an embodiment, the output resized color data is in 24-bit YUV format, and the clock frequency f is 6.5 Mhz.

The invention further comprises converting the resized color data from the first color space to a second color space and outputting converted color data using a clock frequency of f/n, where n is an integer. In an embodiment, the first color space is YUV and the second color space is RGB, and the output converted color data is 16-bit RGB data. Further, in an embodiment, the clock frequency f/n is 3.5 Mhz, where n=2.

The invention also comprises receiving the converted color data and outputting color display data to the display unit using a clock frequency of Nf, where N is an integer. In an embodiment, the output color display data is 16-bit RGB data, and the clock frequency Nf is 39 Mhz, where N=6.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 4 is a timing diagram that shows the relationship of the clock signals of the display controller of the present invention and the timing of the data flow through the functional units of the display controller.

FIG. 6 illustrates a conversion equation for the YUV-RGB color space converter (YRC).

DESCRIPTION OF THE PREFERRED EMBODIMENTS

Figure 1:
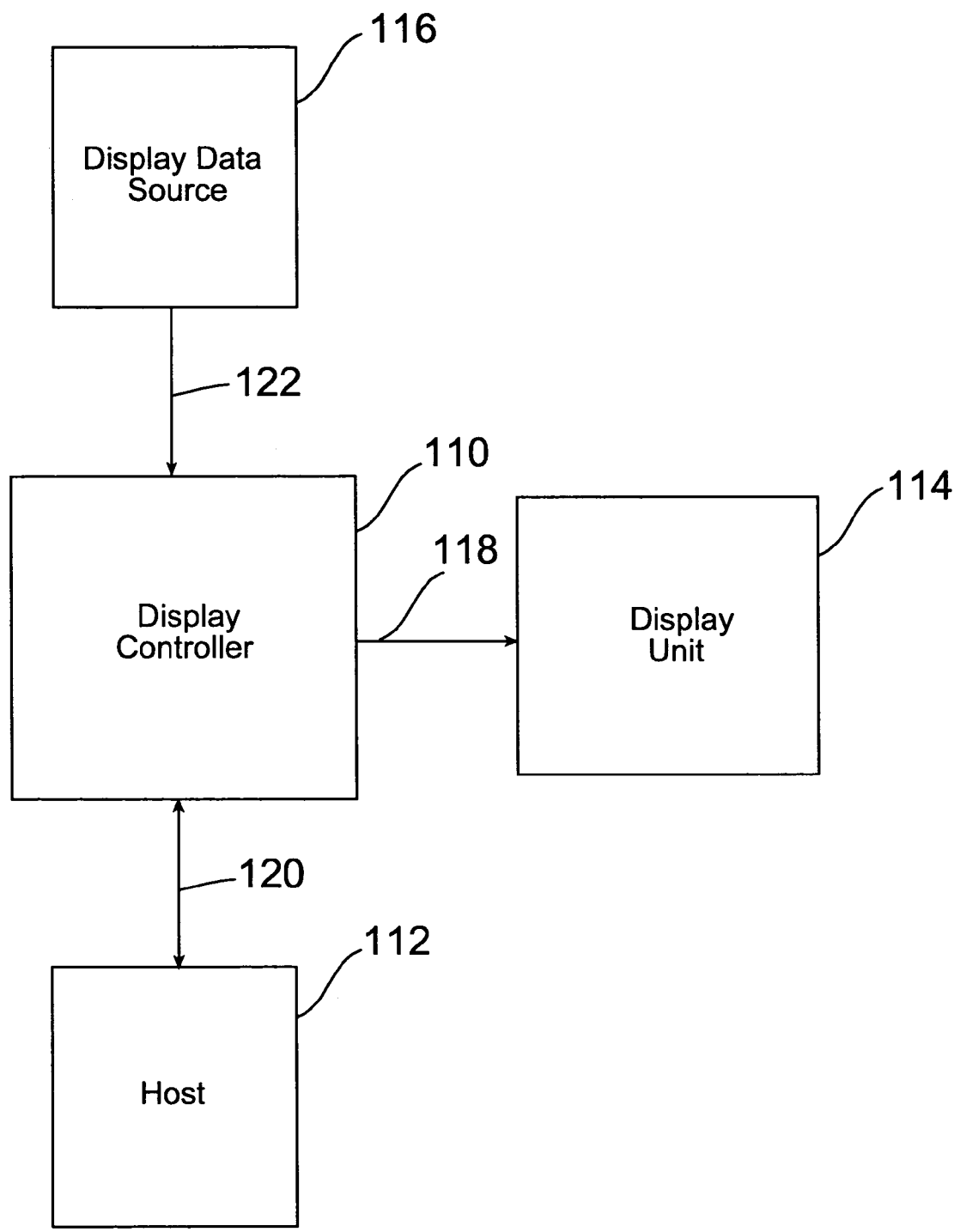
FIG. 1 shows a high-level architecture of a device for displaying a digital image, in accordance with an embodiment of the present invention.

FIG. 1 is an illustration showing a high-level architecture of a device for displaying digital image data, in accordance with one embodiment of the present invention. The device includes a display controller 110, a microprocessor unit (MPU) host 112, a display unit 114, and a display data source 116. The display controller 110 provides the interface between the display unit 114, the MPU host 112, and the display data source 116, and controls the transmission, timing and format of data transmitted to the display unit 114. The timing control signals and data lines are shown generally as line 118. These may in fact be several separate lines but are shown as one line in this general figure. The MPU host 112 performs digital processing operations and communicates with the display controller 110 over line 120, which is shown as a single line in this general figure but in fact may be several address, data and control lines and/or a bus.

The display data source 116 supplies the display controller 110 with a set of display data as indicated by an arrow 122. In various embodiments, the display data source 101 can be a digital video camera, a digital camera, an electromagnetic transmission, a digital data storage device, or an external MPU host, among others. Depending on the particular embodiment, the display controller 110 can be configured with a data port, a network interface card, or an antenna, among others, to receive the set of display data provided from the display data source 116. Additionally, the display controller 110 can be configured to receive the set of display data in any format. For example, the set of display data may be in any suitable digital format, which includes various color formats, among others. In one embodiment, the set of display data is transmitted in digital format after having been captured and processed by digital imaging circuitry. In another example, the set of display data is transmitted in digital format after having been converted from JPEG format by a JPEG CODEC. In yet another example, the set of display data is transmitted in YUV format from an MPU host either associated with or external to the device for displaying digital image data.

Figure 2:
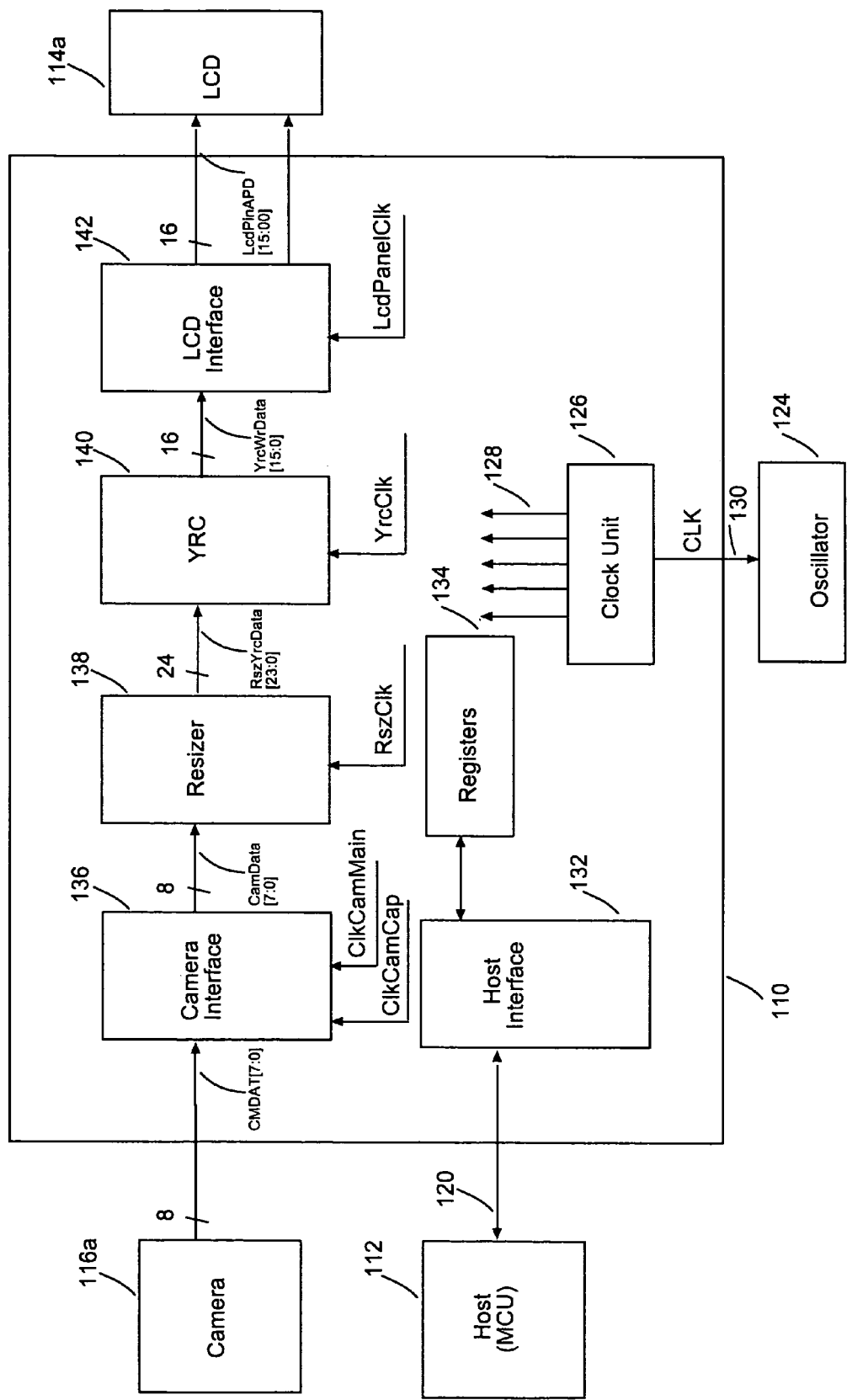
FIG. 2 is block-level diagram showing the primary functional units of the display controller of the present invention.

FIG. 2 shows a more detailed view of the display controller 110. In this embodiment, the display data source 116 (FIG. 1) is a digital camera 116a. The digital camera 116a may be a stand-alone device or part of a camera-enabled cellular phone or PDA. In fact, the entire structure shown in FIG. 2 may be part of a camera-enabled cellular phone or PDA. The host MCU 112 may be, for example, one of the Motorola 68000 (aka m68k) family of microprocessors, which may communicate with the display controller and other functional units of a cell phone or PDA, for example, on line 120, which may be an MC6800 bus, for example. The display controller 110 includes a host interface 132 that allows the host MCU 112 to communicate with the internal functional units of the display controller 110, including internal registers 134.

In this embodiment, the display unit 114 (FIG. 1) is preferably a liquid crystal display (LCD) 114a. As shown further in FIG. 3, LCD 114a preferably includes, for example, a liquid crystal (LC) panel 144 configured as a super twisted nematic (STN) type or an active matrix thin film transistor (TFT) type. Also included is a RAM-incorporated X-driver IC 146 that drives the LC panel 144, and a Y-driver IC 148 for scanning. The RAM 152 stores the image or images that are displayed on the LC panel 144, and may have separate storage areas corresponding to different areas of the panel, e.g. still image area and moving image area. An LCD device of this type is described in detail, for example, in Seiko Epson Corp. published patent application Pub. No. US 2002/0018058 A1, which is incorporated in its entirety by reference herein.

Preferably LCD 114a is a color display with three sub-pixels having red, green, and blue filters to create each color pixel. With careful control and variation of the voltage applied, the intensity of each pixel can range over 256 shades. The display controller 110 generates the correct data bits, frame and line pulse signals, etc. for the LCD 114a so that the proper image is displayed.

Referring again to FIG. 2, also connected to display controller 110 is a crystal oscillator 124 that acts as frequency generator to supply the primary clock signal CLK on line 130 to clock unit 126. Clock unit 126, which may consist of various counters, for example, provides the plurality of clock signals 128 for use by the different functional units in the display controller 110. The timing of the clock signals is an important aspect of the present invention in that the selected ratios of the clock signals allows the present invention to sequentially pass data directly from the camera 116a to the RAM-incorporated LCD 114a without storing the data temporarily in a display buffer (VRAM).

Figure 3:
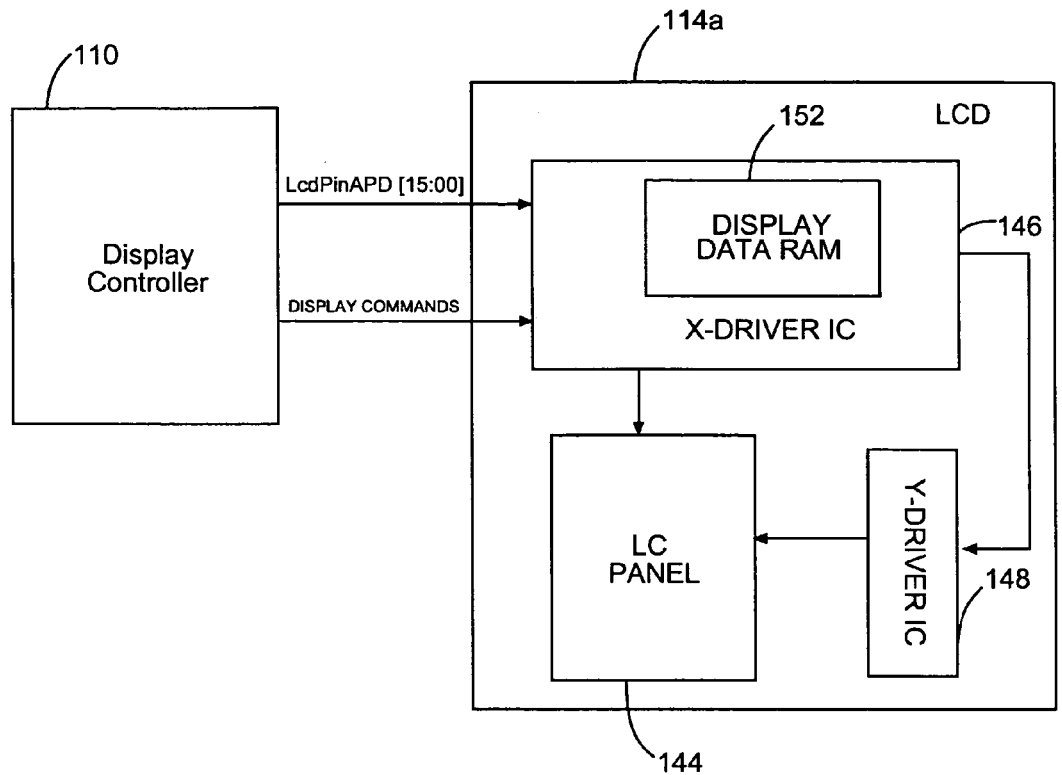
FIG. 3 is block-level diagram showing the primary functional units of a RAM embedded liquid crystal display (LCD), in accordance with an embodiment of the present invention.

FIG. 4 is a timing diagram that shows the relationship of the clock signals of the display controller 110 and the timing of the data flow through the functional units of display controller 110. With reference to FIGS. 2 and 3, the clock unit 126 generates the following signals with the following relative frequencies:

| | |
|---|---|
| ClkCamCap | frequency = f |
| ClkCamMain | frequency = f |
| RszClk | frequency = f |
| YrcClk | frequency = f/2 |
| LcdPanelClk | frequency = 6f |

In an embodiment of the present invention, f=6.5 MHz. So, f/2=3.25 MHz, and 6f=39 MHz. The clock signals will be discussed with reference to each of the functional units of the display controller 110.

In utilizing the present invention, the particular selection of the ratio of clock signals and the individual frequencies selected will depend on the particular system and the design of the functional components. However, if the clock frequency for driving the camera interface is f, then the clock frequency for the resizer is preferably f, the clock frequency for the color converter is preferably a fraction of f, and the clock frequency for the display interface is preferably a multiple of f. For example, the clock frequency for the color converter (e.g. YRC) could be f/2, f/4, f/6, etc., and the clock frequency for the display interface (e.g. LCD interface) could be 2f, 3f, 4f, 5f, 6f, 7f, 8f, etc.

As shown in FIG. 2, the display controller 110 includes a camera interface 136. Camera interface 136 receives 8 bits of color camera color data, CMDAT [7:0], from the camera 116a. This data is preferably in YUV 4:4:2 format. YUV is a color space or coordinate system in which one component is luminance and the other two components are related to hue and saturation. The luminance provides a grayscale version of the image (e.g. such as on a black and white display), and the chrominance components provide the additional information required to convert the grayscale image to a color image. The luminance of a display is the sum of the luminance of the red, green, and blue components. For a particular definition of red, green, and blue, the luminance of any color can be calculated from the weighted sum:

$Y=0.3R+0.6G+1.0B.$

Chrominance is the difference between a color and a reference white at the same luminance. The chrominance can be expressed by a set of color differences, V and U, where V and U are defined by:

$V=R-Y;$ and $U=B-Y.$

The camera interface 136 samples the camera color data, CMDAT [7:0], from the camera 116a according to the clock signal ClkCamCap that is generated by the clock unit 126. The camera interface 136 can be programmed to use the clock rising/falling edge to latch the camera color data. In a preferred embodiment, the frequency of the clock signal ClkCamCap is set to 6.5 MHz. The camera interface 136 outputs the latched color camera data as 8 bits, CamData [7:0], in YUV format. This camera interface data, CamData [7:0], is generated according to the clock signal ClkCam- Main that is generated by the clock unit 126. In a preferred embodiment, the frequency of the clock signal ClkCamMain is set to 6.5 MHz.

Figure 5:
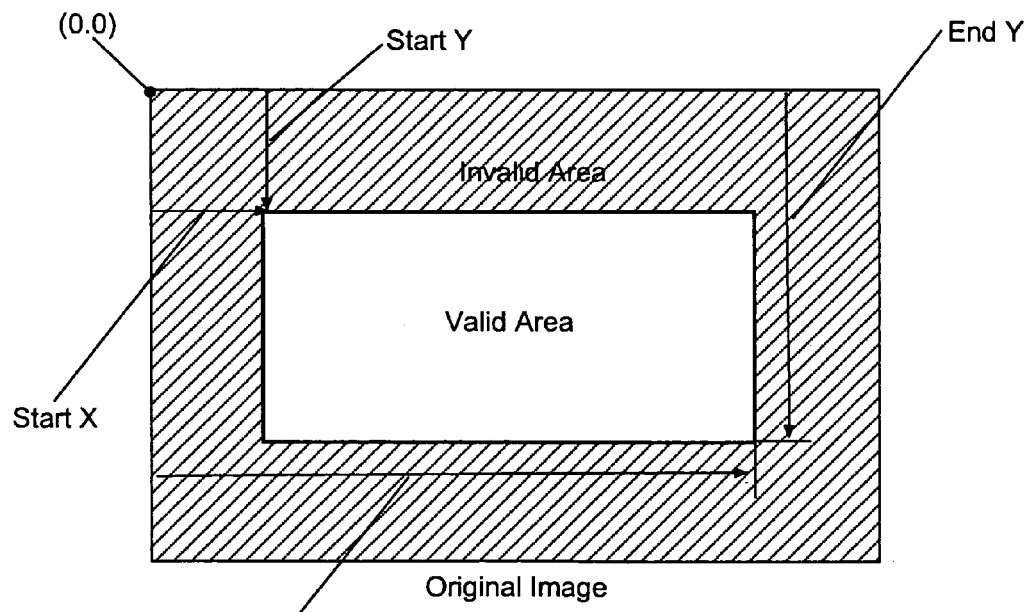
FIG. 5 illustrates the trimming function of the resizer unit of the display controller of the present invention.

The output of the camera interface 136 is input to the resizer 138. Resizer 138 receives the camera interface data, CamData [7:0], and then performs a trimming function and a compression function. The trimming function is similar to cropping an image and is used to trim or cut off the unwanted or unnecessary parts of the original image that is input from the camera. Referring to FIG. 5, the unwanted (invalid) area of the original image can be defined by programming Start and End addresses in X/Y Start/End position registers that are shown generally in FIG. 2 as forming part of registers 134. This results in a smaller, "valid area" of image data being passed on through the data pipeline. Next, resizer 138 performs compression on the "trimmed" image. An N×N pixel block is compressed into a single pixel, by averaging, for example. The resizer 138 output, RszYrcData [23:0], is preferably 24-bit YUV resizer data that is generated according to the clock signal RszClk, which is generated by the clock unit 126. In a preferred embodiment, the frequency of the clock signal RszClk is 6.5 MHz.

The output of the resizer 138 is input to the YUV-RGB color space converter (YRC) 140. The YRC 140 receives the 24-bit YUV resizer data, RszYrcData [23:00], and converts it into 16-bit RGB converted data, YrcWrData [15:00], in accordance with the clock signal YrcClk, which is generated by the clock unit 126. In a preferred embodiment, the frequency of the clock signal YrcClk is 3.25 MHz. A known relationship exists between the RGB and YUV coordinate systems and a color value in one coordinate system can be mapped into a color space in the other system. This is usually performed with look-up tables (LUTs) and an interpolation technique or with a direct YUV/RGB conversion equation programmed into the logic of the converter. FIG. 6 illustrates one such conversion equation. The values selected for each of $E_R$, $E_G$, $E_B$, $E_y$, $E_{pb}$, and $E_{pr}$ are determined empirically for each device and are dependent, in part, on the characteristics of the input device, e.g camera 116a, and the output device, e.g. LCD 116a.

The output of the YRC 140, is input to the LCD interface 142. The LCD interface 142 receives the 16-bit RGB converted data, YrcWrData [15:00], places the data in the proper format for the particular LCD 114a, and generates the correct control signals for the particular LCD 114a. The LCD interface 142 outputs 16-bit RGB display data, LcdPinAPD [15:00], in accordance with the clock signal LCD-PanelClk, which is generated by the clock unit 126. In a preferred embodiment, the frequency of the clock signal YrcClk is 39 MHz.

The LCD 114a receives the 16-bit RGB display data, which are stored in the display data RAM 152 (FIG. 3). Also, display command (control) signals generated by the LCD interface 142 are received by the X-driver IC 146 in order to properly display the image that was originally captured by the camera 116a.

The present invention also comprises a method for operating a display controller that controls display of color data from a display data source on a display unit. The method comprises receiving color source data described in a first color space from the display data source and outputting the received color data using a clock frequency of f. In an embodiment, the display data source is a digital camera and the display unit is a liquid crystal display (LCD). Also, the color source data described in a first color space is 8-bit camera data in YUV 4:2:2 format, and the output received color data is in YUV format. Further, in an embodiment, the clock frequency f is 6.5 Mhz.

The method also comprises trimming and compressing the received color data and outputting resized color data using a clock frequency of f. In an embodiment, the output resized color data is in 24-bit YUV format, and the clock frequency f is 6.5 Mhz.

The method further comprises converting the resized color data from the first color space to a second color space and outputting converted color data using a clock frequency of f/n, where n is an integer. In an embodiment, the first color space is YUV and the second space is RGB, and the output converted color data is 16-bit RGB data. Further, in an embodiment, the clock frequency f/n is 3.5 Mhz, where n=2.

The method also comprises receiving the converted color data and outputting color display data to the display unit using a clock frequency of Nf, where N is an integer. In an embodiment, the output color display data is 16-bit RGB data, and the clock frequency Nf is 39 Mhz, where N=6.

In the present invention, the display controller 110 is preferably a single integrated circuit (IC). However, it will be appreciated that each of the functional units can comprise hardware, software, firmware, or some combination thereof. Further, it will be appreciated that the method of the present invention can also be embodied as computer readable code on a computer readable medium. The computer readable medium is any data storage device that can store data, which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

An advantage of the present invention is that the data pipeline in the display controller described herein does not require a video RAM (VRAM). Instead, the unique timing of the transmission of the data through the pipeline allows the camera data to be sequentially passed through the display controller to the LCD without being temporarily buffered in the display controller. Elimination of the video memory lowers the chip cost, reduces the power requirements, reduces delay due to writing and reading from the video memory, and reduces the pin count since fewer power pins are required.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A display controller that controls display of color data from a display data source on a display unit, comprising:
   a display data source interface that receives color source data described in a first color space from the display data source and outputs interface data described in the first color space using a clock frequency of f;
   a resizer that receives the interface data from the display data source interface described in the first color space and that trims and compresses the interface data and outputs resizer data described in the first color space using a clock frequency of f;

a color space converter that receives the resizer data and converts the resizer data into converted data described in a second color space using a clock frequency of f/n, where n is an integer; and a display unit interface that receives the converted data from the color space converter and that outputs display data described in the second color space to the display unit using a clock frequency of Nf, where N is an integer.

2. A display controller as described in claim 1 wherein the clock frequency f is 6.5 Mhz; the clock frequency f/n is 3.5 Mhz, where n=2; and the clock frequency Nf is 39 Mhz, where N=6.

3. A display controller as described in claim 1 wherein the display data source is a digital camera and the display unit is a liquid crystal display (LCD).

4. A display controller as described in claim 3 wherein the color source data described in the first color space is 8-bit camera data in YUV 4:2:2 format, and the output interface data is in YUV format.

5. A display controller as described in claim 1 wherein the output resizer data is in 24-bit YUV format.

6. A display controller as described in claim 1 wherein the first color space is YUV and the second color space is RGB, and the converted data is 16-bit RGB data.

7. A display controller as described in claim 1, wherein the display data source interface, the resizer, the color space converter, and the display unit interface comprise a single integrated circuit (IC).

8. A method for operating a display controller that controls display of color data from a display data source on a display unit, comprising:

receiving color source data described in a first color space from the display data source and outputting the received color source data using a clock frequency of f;

trimming and compressing the received color source data and outputting resized color data using a clock frequency of f;

converting the resized color data from the first color space to a second color space and outputting converted color data using a clock frequency of f/n, where n is an integer; and receiving the converted color data and outputting color display data to the display unit using a clock frequency of Nf, where N is an integer.

9. A method for operating a display controller according to claim 8, wherein the clock frequency f is 6.5 Mhz; the clock frequency f/n is 3.5 Mhz, where n=2; and the clock frequency Nf is 39 Mhz, where N=6.

10. A method for operating a display controller according to claim 8, wherein the display data source is a digital camera and the display unit is a liquid crystal display (LCD).

11. A method for operating a display controller according to claim 10, wherein the color source data described in the first color space is 8-bit camera data in YUV 4:2:2 format, and the output received color source data is in YUV format.

12. A method for operating a display controller according to claim 8, wherein the output resizer color data is in 24-bit YUV format.

13. A method for operating a display controller according to claim 8, wherein the first color space is YUV and the second color space is RGB, and the output converted color data is 16-bit RGB data.

14. A medium readable by a machine embodying a program of instructions executable by the machine to perform a method of operating a display controller that controls display of color data from a display data source on a display unit, the method comprising:

receiving color source data described in a first color space from the display data source and outputting the received color data using a clock frequency of f;

trimming and compressing the received color data and outputting resized color data using a clock frequency of f;

converting the resized color data from the first color space to a second color space and outputting converted color data using a clock frequency of f/n, where n is an integer; and receiving the converted color data and outputting color display data to the display unit using a clock frequency of Nf, where N is an integer.

* * * * *